United States Patent [19]
Chichester

[11] 4,418,803
[45] Dec. 6, 1983

[54] METHOD AND MEANS FOR BLEEDING HYDRAULIC BRAKES

[75] Inventor: Willard L. Chichester, Battle Creek, Mich.

[73] Assignee: Clark Equipment Company, Buchanan, Mich.

[21] Appl. No.: 267,145

[22] Filed: May 26, 1981

[51] Int. Cl.³ .............................................. B60T 11/30
[52] U.S. Cl. ........................................ 188/352; 60/453
[58] Field of Search ................ 188/352, 152, 151 A; 303/1, 2, 3, 50-56, 10-12; 60/453, 336, 378, 584, 327; 180/132, 133, 135, 140, 149, 152

[56] References Cited

U.S. PATENT DOCUMENTS

| | | | |
|---|---|---|---|
| 3,917,013 | 11/1975 | Orr | 180/6.7 |
| 4,038,823 | 8/1977 | Mostert | 188/352 X |
| 4,069,889 | 1/1978 | Yapp et al. | 60/453 X |
| 4,174,615 | 11/1979 | Kuhn | 60/453 |
| 4,307,917 | 12/1981 | Hasselbacher et al. | 188/352 X |

FOREIGN PATENT DOCUMENTS 2406552  6/1979  France ................................ 188/352

*Primary Examiner*—Douglas C. Butler
*Attorney, Agent, or Firm*—J. C. Wiessler

[57] ABSTRACT

A method and device for purging air from the hydraulic brake system of vehicles wherein the master brake cylinder is connected hydraulically to a sump return conduit of a hydraulic component of the main hydraulic system which combines with a restriction associated with the master cylinder to cause a flow of pressure fluid from the return conduit through the brake system when air bleed valves in the brake system are open.

21 Claims, 3 Drawing Figures

METHOD AND MEANS FOR BLEEDING HYDRAULIC BRAKES

BACKGROUND OF THE INVENTION

The field of art to which the invention pertains concerns hydraulic brake systems, and particularly the purging of air from such systems.

It is occasionally necessary to purge air from the hydraulic lines and other components of a hydraulic brake system because air is compressible and its presence in a brake system effects a "soft" pedal feel which compromises the functioning of the brake system. Bleeding or purging of the air from such brake systems is required at original assembly when the system is first filled with fluid, and on occasion from time to time thereafter as may be required when the brake system is serviced, for example.

Such systems are often difficult to purge and merely depressing the brake foot pedal while the brake system bleed valves are open may not accomplish complete purging of the air entrained in the brake fluid. Heretofore it has been often necessary to employ a separate brake bleeding device which provides a flow of pressurized brake fluid for pressure purging of air from the brake system.

SUMMARY

A method and means for purging air from the hydraulic brake system of vehicles by interconnecting hydraulically the brake master cylinder and a sump return conduit of a hydraulic system component so as to cause a flow of pressure fluid into the brake system to purge it of entrained air when the bleed valves of the brake system are open and fluid is flowing in the return conduit.

The main object of the invention is to provide an improved method and means for purging air from hydraulic brake systems.

DETAILED DESCRIPTION

Figure 1:
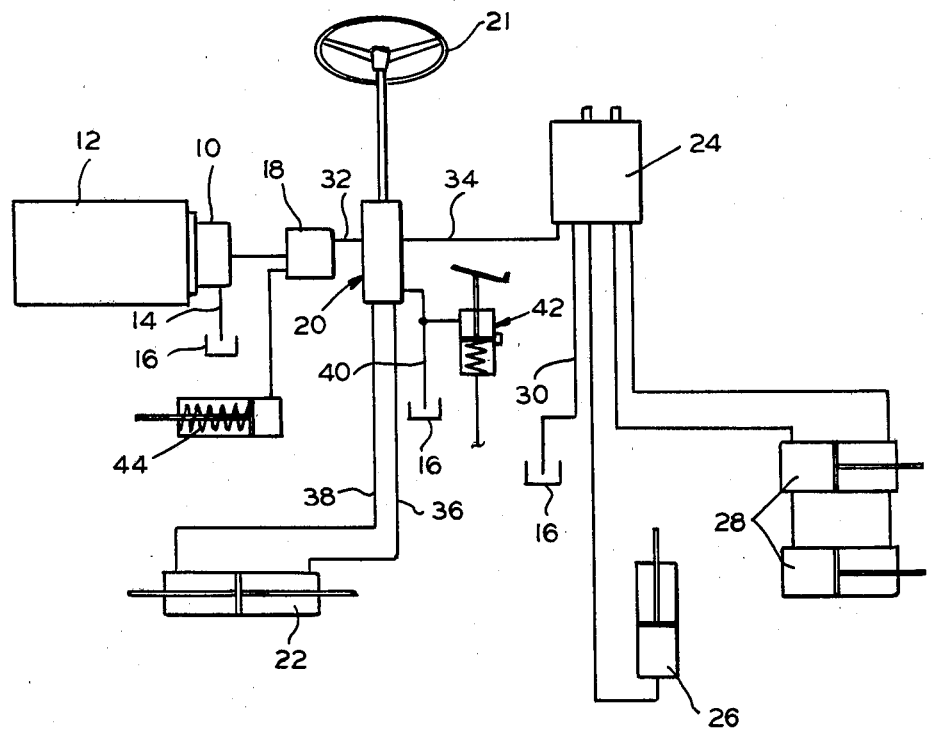
FIG. 1 is a schematic representation of a main hydraulic system for an industrial lift truck.

FIG. 1 discloses an exemplary embodiment of the invention in the hydraulic system of an industrial lift truck, although it should be understood that the invention is applicable to a hydraulic brake system for any vehicle having a return line to sump which is operatively connected from a hydraulic component of the hydraulic system to the master brake cylinder for purging the brake system of entrained air, as will become apparent as the description proceeds.

A fixed displacement pump 10 operated by an electric motor 12 and a suction line 14 connected to a sump 16 selectively supplies pressure fluid through a priority demand valve 18 to a steering control unit 20 operated manually by a steering wheel 21, which controls the operation of a pressure actuated steer cylinder 22 connected through a steer axle to steer wheels (not shown), and to a main control valve assembly 24 which is adapted to operate a single-acting upright lift cylinder 26 and double-acting upright tilt cylinders 28, valve means 24 being suitably connected to the lift and tilt cylinders by conduits as shown, and having a return line 30 to sump 16. A by-pass conduit 15 (FIG. 2) has a pressure relief valve 17 therein for by-passing excess pressure fluid to the sump during operation in known manner. Priority valve 18 is connected to the steering unit 20 by a conduit 32 and to valve means 24 by a conduit 34, valve 18 being adapted to provide at all times of steering demand that volume of pressure fluid which is required to steer the vehicle prior to the meeting of any demand requirement at valve 24, so that steering demand always has priority over the demand of any other hydraulic component in the system. The steering unit 20 is connected by conduits 36 and 38 to power steering cylinder 22 and to the reservoir 16 by a return line 40, the return line being operatively connected to a service brake master cylinder 42 for the purpose of carrying out this invention. The priority valve 18 is also connected to a parking brake cylinder 44 for operating the same under certain preselected conditions.

The steering unit 20 includes an orbital type pump 50 (FIG. 2) which is connected directly to steering wheel 21, which operates pump 50 in either direction by turning the steering wheel, and a three-way, open-center steer valve 52 having left, center and right hand valve sections 54, 56 and 58, respectively, adapted to interface ports a, b, c, d, e and f, as shown by the standard valve flow legends, depending upon how the valve is actuated to engage any one of the valve sections 54, 56 or 58. A known mechanical connection is represented at numeral 60 between pump 50 and the valve for actuating the spring-centered valve in one direction or the other upon turning of steer wheel 21 in either direction. In the centered position illustrated there is no steering demand and the output of pump 10 which is directed to valve 52 flows through the open-center valve section 56 from port e to port f to sump 16 by way of conduit 32, a check valve 62, conduit 40 and a restriction 64 in conduit 40 which is associated with master brake cylinder 42 for a purpose to be described.

Master cylinder assembly 42 comprises a first chamber 70, a second chamber 72 having a return spring therein, a brake pedal 74 for actuating a master cylinder piston 76, lines connecting opposite sides of restriction 64 to chamber 70, a conduit 78 connecting the first and second chambers on opposite sides of the piston when it is in a non-actuated position, and a discharge line 80 to wheel brake cylinders, not shown, and to air bleed valves 82 associated with the wheel cylinders in known manner for permitting the purging of air from the brake system when the bleed valves are open. Two bleed valves are shown for a two-wheel brake vehicle although, of course, the number of bleed valves thus connected will vary depending upon the number of wheel brakes.

Acutation of valve 52 rightwardly to engage section 54 effects the introduction of pressure fluid from the pump 10 to orbital pump 50 through ports e and b so that turning movement of steer wheel 21 effects a transferral of pressure fluid through the pump and ports c and d to the right hand side of power cylinder 22 to actuate the steer wheels in one direction, return fluid being connected from the left side of cylinder 22 to sump 16 by way of conduits 38 and 40, ports a and f, and restriction 64. When valve 52 is actuated leftwardly to engage section 58 pressure fluid is connected through ports e and c to the right side of pump 50 and thence to the left side of the steer cylinder by way of ports b and a, return fluid from the cylinder to the sump flowing through conduits 36 and 40 and ports d and f.

A check valve 84 in a conduit 86 connects conduits 32 and 40 as shown so that manual steering may be effected in the event of a failure of pump 10 by turning of the steer wheel 21 and actuation of valve 52 in either direction which effects a circulation of fluid from conduit 40 to line 32 through check valve 84 as the pressure in conduit 32 begins to decrease with the initiation of transferral of fluid from one side of steer cylinder to the other side thereof via ports e, b, c, d, or e, c, a, b. Any leakage of fluid through the pump or cylinder seals, for example, will be made up by suction of pump 50 from the sump through check valve 62.

In normal operation with the pump running and no steering demand, valve 52 is in its centered position and pump discharge flows through the input and return conduits 32 and 40 by way of ports e and f to sump 16. In this condition the brake system may be purged of air by opening bleed valves 82, the pressure drop across restriction 64 causing an increase in pressure in brake cylinder chamber 70 and thereby a flow of a portion of the return conduit fluid into cylinder chamber 72 and through the brake system via piston by-pass line 78 and through the bleed valves which will assure a complete purging of air from the brake system, following which the bleed valves are closed. Conduit 40 downstream of restriction 64 is ordinarily a soft, low pressure line which may be pinched or squeezed to provide additional resistance in the line and therefore increased pressure in cylinder chamber 70 to additionally insure complete purging. It is clear, of course, that while the restriction in conduit 40 is illustrated and described as comprising both restriction 64 and optionally a pinching of the conduit, either one alone will suffice to obtain the desired effect. Any leakage in the brake system will be made up whenever fluid is flowing in the return conduit.

Figure 2:
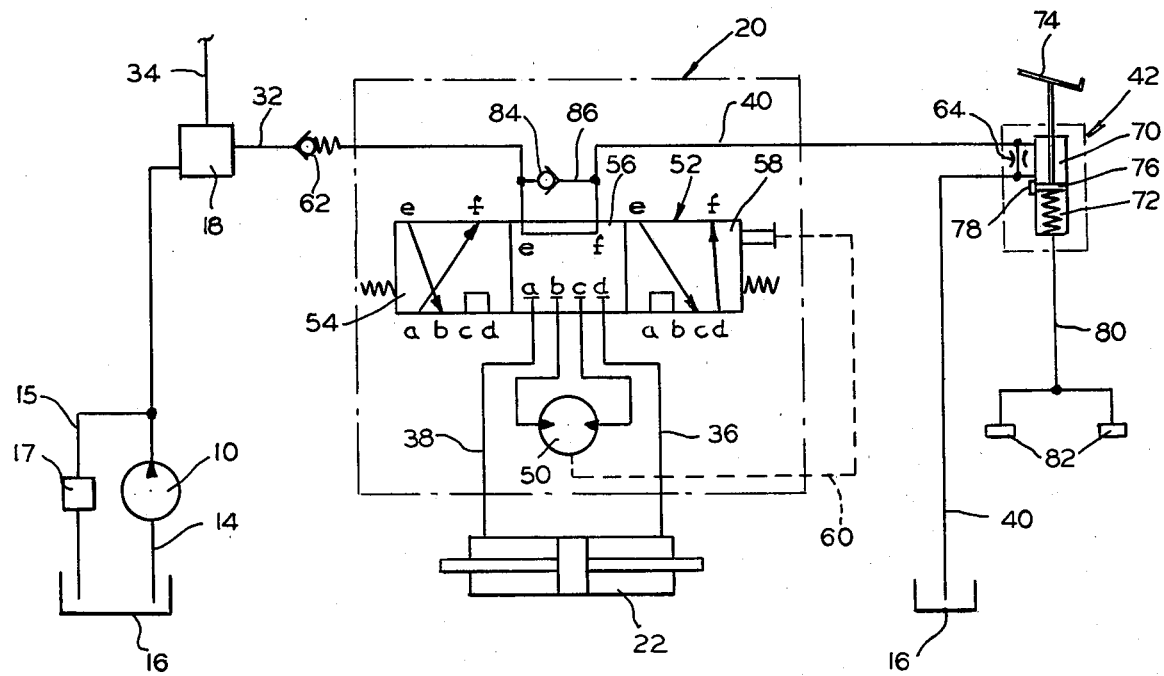
FIG. 2 is a more detailed schematic view of one embodiment of a portion of the system of FIG. 1.

The brake system of FIG. 2 can also be purged of air when the pump is running and the control valve 52 is actuated in either direction to engage valve sections 54 or 58 by the turning of the steering wheel 21 a return flow to sump is effected through conduit 40 which and creates a pressure drop across restriction 64, the level of which is determined by the velocity of the turning of steer wheel 21, and therefore of orbital pump 50. Basically the same condition for purging air from the brake system may be thus provided at brake cylinder 42 as when the control valve is in the centered position, as described above.

Previously herein manual steering was described as when pump 10 is not in operation via the operation of check valve 84. Normally under such conditions with the steer wheels in ground engagement purging of the brake system cannot be accomplished because of the resistance to turning of the steer wheels and therefore the substantial elimination of fluid flow through conduit 40, substantially all of said flow passing through check valve 84. However, in the event the steer wheels are raised clear of the ground or floor to reduce the steering effort it is then possible to purge the brake system without the operation of pump 10 by a relatively rapid turning of pump 50 by steering wheel 21 and actuation of valve 52 to the right or left which will communicate one side of steer cylinder 22 with return conduit 40 as before described. Purging the brake system may then be done with the bleed valves open and by at least partially closing conduit 40 downstream of restriction 64 by pinching or squeezing it as described above. However, it is preferred under all conditions that the brake system be purged with pump 10 running.

Figure 3:
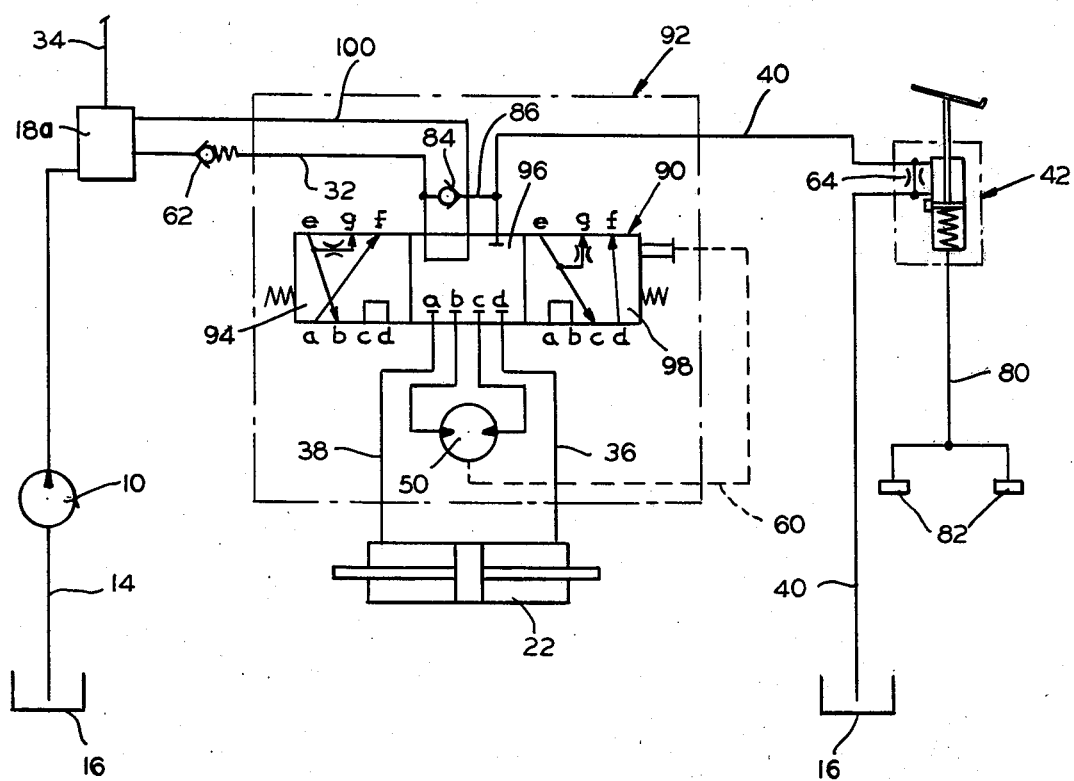
FIG. 3 is a schematic view of another embodiment of a portion of the system of FIG. 1.

The preferred embodiment of my invention is disclosed in FIG. 3 utilizing a closed-center control valve 90 in a steering control unit 92 having ports a, b, c, d, e, f and g in each of three valve sections 94, 96 and 98. In FIG. 3 similar parts have been numbered the same as in FIG. 2, including ports a, b, c, d, e and f in valve 90.

Heretofore in the hydraulic systems of electric lift trucks it has been a common practice to provide two or more fixed displacement pump and motor combinations to meet the widely different hydraulic pressures and flow rates required by different hydraulic components. For convenience a single supply pump only is shown in FIG. 2 for supplying both the steering and lift and tilt cylinder circuits, although in practice a separate motor pump would be used to supply the lift cylinder circuit, and a relatively small motor-pump to supply the steer and tilt circuits the requirements of which are substantially smaller than that of the lift circuit. In the embodiment of FIG. 3 it is intended that the system be used with a single supply pump 10 operable with an SCR solid state control, not shown, to integrate the flow requirements of each major working portion of the hydraulic system so that upon operator's demand at the various control valves switching arrangements are adapted to change the pulse repetition rate of the SCR control to increase the average output voltage to the pump-motor 10, 12 which causes the pump to increase its rpm an amount as required to increase the rate of flow demanded by, for example, the lift cylinder as compared with the flow rate required of the steering system. An SCR controller is intended to be combined in such a system to provide several different constant lift pump motor speeds as may be required by different hydraulic components of the system. The SCR controller senses pump motor current and voltage and uses these values in a servo feedback loop to hold the selected pump motor rpm constant regardless of the torque required, up to the limit of the lift cylinder motor. This also eliminates the requirement for the pressure relief conduit and valve 15 and 17 at pump 10 in FIG. 2.

The foregoing discussion of the SCR controller to control pump speed and output is not a part of the present invention and need not be disclosed herein but is mentioned as a background basis for the provision of closed-center valve 90 which causes the pump and motor to operate at a preselected speed and output only and whenever steering is demanded by the operator, assuming that main valve 24 is inoperative. A detailed disclosure of a complete hydraulic system which utilizes, amount other components, an SCR controller and priority demand valve 18 is disclosed and claimed in my U.S. application Ser. No. 291,673, filed Aug. 10, 1981, common assignee.

Normally in operation with control valve 90 in its centered position as shown pump 10 may be either inoperative or operating to supply the lift and/or tilt cylinders 26 and 28 via the priority demand valve 18 and the secondary circuit conduit 34. The first or lowest level pump rpm for power steering is available whenever the operator's seat is occupied, the parking brake is disengaged, and the ignition key is "on", as well as, of course, during all driving conditions of the truck and during operation of other hydraulic components such as the tilt cylinders. In a neutral operating condition pump 10 pumps a predetermined fluid volume through ports e and g of valve section 96 back to the priority valve 18 through a conduit 100 wherein it combines with secondary flow to the control valve 24 which, when unactuated, directs the fluid flow to the sump through the open-center control valve sections. Under such conditions the braking system cannot be purged because there is no flow of fluid through conduit 40 to the sump.

Under any condition of operation of the truck or of any hydraulic component thereof wherein control valve 90 is actuated to engage either section 94 or 98 thereof the fluid flow through said valve sections is as explained hereinabove in respect of FIG. 2 to operate orbital motor 50 in one direction or the other upon turning by the operator of steering wheel 21, which operates steering cylinder 22 which in turn discharges fluid at return line pressure either through ports a, f or d,f, conduit 40 and restriction 64. Any excess fluid which may not be required for steering is directed through connected ports g and the conduit 100 to the priority valve. Whenever valve section 94 or 98 is engaged turning of steering wheel 21 with pump 10 running provides available return line fluid for operation of the brake purging system, if desired. If pump 10 is not in operation for any reason brake system purging may be effected as again previously described in conjunction with FIG. 2 by turning the steering wheel with the steer wheels raised out of ground contact so as to pump return line fluid via the exhaust side of steering cylinder 22 through conduit 40 with the return conduit pinched or squeezed downstream of restriction 64 to provide the necessary pressure at master brake cylinder 42 to purge the brake system of entrained air.

A suitable steering control unit 92 is manufactured by TRW, Ross Gear Division, Model HGA 14028 -A2.

Preferred embodiments of my invention in a lift truck hydraulic system are disclosed in conjunction with the operation of the power steering system which normally has an always readily available supply of pumped hydraulic fluid for use in brake system purging by merely operating the steering wheel 21 with the bleed valves open or by centering the open-center control valve in FIG. 2. Also, if the pump is not operating, by elevating the steer wheels and operating the power steering system manually.

In principle a brake purging system using my invention can be utilized by communicating any return conduit to sump with a brake master cylinder in a manner such as is disclosed, the return conduit being connected with some hydraulic component other than a power steering system in a hydraulic system through which passes hydraulic fluid to the return conduit. In the broader context of this invention it is only necessary that the return to sump conduit be capable of communicating with the master brake cylinder during flow of fluid through the return conduit and that a restriction in said conduit be effective to pressurize the master cylinder and brake system in a manner such as is disclosed herein. It would be possible, for example, although not preferred, in the herein disclosed hydraulic system to communicate the master cylinder with either open-center or closed-center lift or tilt cylinder valves 24. The open center valve would operate to communicate at any time the valve is in a neutral position with the master cylinder, as well as during operation of the tilt cylinders in either direction or the lift cylinder in a downward direction, while use of closed-center valves would function to communicate return fluid with the master cylinder only during such operation of the respective cylinders. However, it is not preferred to utilize the valve or cylinder return lines in this manner either because of the volume of fluid which must be handled by the lift cylinder valve, for example, or because of the necessity of operating the lift or tilt cylinders to achieve brake purging in the use of closed-center control valves. It is therefore clear that in the particular hydraulic systems disclosed herein that the combination with the power steering unit is preferred. Of course, the invention is applicable also to other kinds of hydraulic systems associated with other kinds of vehicles, all as will be apparent to persons skilled in the art.

Although I have described and illustrated only two specific embodiments of my invention, it will be understood by those skilled in the art that modifications may be in the structure, form, and relative arrangement of parts without departing from the spirit and scope of the invention. Accordingly, it should be understood that I intend to cover by the appended claims all such modifications which fall within the scope of my invention.

I claim:

1. A method of purging air from a vehicle hydraulic brake system having a master control cylinder means and air bleed valves in the brake system, comprising the steps of opening the bleed valves, communicating a portion of the fluid in a fluid return conduit which connects an operation hydraulic component of the vehicle to the sump with the master control cylinder means, and restricting the fluid return conduit to produce a pressure of fluid in the master control cylinder means which causes a flow of such fluid through the bleed valves and a consequent purging of air from the fluid in the brake system.

2. A method as claimed in claim 1 wherein the master control cylinder means includes first and second chambers separated by a piston means, said portion of said return conduit fluid being adapted to communicate with the first and second chambers while by-passing said piston means.

3. A method as claimed in claim 1 wherein the fluid return conduit may be restricted by a manual pinching thereof.

4. A method as claimed in claim 1 wherein the hydraulic component is a power steering assembly and the method comprises the further step of rotating an operator's steering wheel to actuate the power steering assembly in a manner to eject fluid into the fluid return conduit.

5. A method as claimed in claim 1 wherein the restriction in the fluid return conduit is effected by a manual pinching of said conduit.

6. In a main hydraulic system for vehicles a supply pump, a control valve for controlling the operation of a hydraulic component of the vehicle adapted to operatively connect the pump to a sump by way of a fluid return conduit which connects the control valve to the sump, a hydraulic brake system operatively connected to said return conduit including a master control cylinder means and air bleed valves operatively connected to said cylinder means, and a restriction in said fluid return conduit for generating a flow of fluid through said brake system which purges entrained air from the brake system through the bleed valves when the bleed valves are open and fluid is flowing, in said return conduit.

7. A hydraulic system as claimed in claim 6 wherein said hydraulic component comprises a power steering means.

8. A hydraulic system as claimed in claim 6 wherein said master control cylinder means includes first and second chambers adapted to communicate a portion of the fluid in the return conduit to said bleed valves.

9. A hydraulic system as claimed in claim 8 wherein said master control cylinder means includes a brake actuating piston separating said first and second chambers, and a conduit connecting said first and second chambers and bypassing said piston.

10. A hydraulic system as claimed in claim 9 wherein said latter conduit by-passes said piston when it is in an unactuated position.

11. A hydraulic system as claimed in claim 6 wherein said control valve is an open-center valve which communicates pump discharge fluid with said sump through said return conduit when it is in an inoperative position to control flow to or from said hydraulic component.

12. A hydraulic system as claimed in claim 6 wherein said control valve is a closed-center valve which when actuated to operate said hydraulic component connects said hydraulic component to said sump through said return conduit.

13. A hydraulic system as claimed in claim 12 wherein said hydraulic component is a power steering means, and an operator's steering wheel which during rotation actuates said power steering means which ejects fluid into said return conduit.

14. A hydraulic system as claimed in claim 13 wherein said power steering means comprises an orbital pump and a power steering cylinder.

15. A hydraulic system as claimed in claim 6 wherein the restriction in said fluid return conduit may be effected by pinching the return conduit.

16. A hydraulic system as claimed in claim 6 wherein the restriction in said fluid return conduit is a restrictive element in the conduit.

17. A hydraulic system as claimed in claim 16 wherein the restriction in said fluid return conduit may be increased by a manual pinching of the conduit.

18. In a main hydraulic system for vehicles a supply pump, a hydraulic component of the vehicle adapted to be operated by pump discharge and operatively connected to a sump by way of a fluid return conduit under selected conditions of operation, a hydraulic brake system operatively connected to said return conduit including a master control cylinder means and air bleed valves operatively connected to said cylinder means, and a restriction in said fluid return conduit for generating a flow of fluid through said brake system which purges entrained air from the brake system through the bleed valves when the bleed valves are open and fluid is flowing in said return conduit.

19. A hydraulic system as claimed in claim 18 wherein said master control cylinder means includes first and second chambers adapted to communicate a portion of the fluid in the return conduit to said bleed valves.

20. A hydraulic system as claimed in claim 19 wherein said master control cylinder means includes a brake actuating piston separating said first and second chambers, and a conduit connecting said first and second chambers and bypassing said piston.

21. A hydraulic system as claimed in claim 18 wherein the restriction in said fluid return conduit may be effected by a restrictive element in the conduit and/or by a manual pinching of the conduit.

* * * * *